United States Patent [19]

Becker

[11] Patent Number: 5,020,945

[45] Date of Patent: Jun. 4, 1991

[54] BORING APPARATUS AND METHOD OF MODIFYING CONCRETE BLOCKS

[76] Inventor: Samuel R. Becker, 4336 Eastwood Dr., Sarasota, Fla. 34232

[21] Appl. No.: 503,226

[22] Filed: Apr. 2, 1990

Related U.S. Application Data

[62] Division of Ser. No. 477,330, Feb. 8, 1990, Pat. No. 4,958,467.

[51] Int. Cl.[5] .......... B23B 35/00

[52] U.S. Cl. .......... 408/1 R; 408/89; 408/109

[58] Field of Search .......... 408/1 R, 54, 56, 69, 408/87, 90, 135, 110, 103, 109, 89; 52/607, 514, 127.3, 127.4

[56] References Cited

U.S. PATENT DOCUMENTS

| | | | |
|---|---|---|---|
| 311,055 | 1/1885 | Ashcroft | 52/607 |
| 1,277,829 | 9/1918 | Baum | 52/607 |
| 1,728,396 | 9/1929 | Day | 408/54 |
| 1,928,756 | 10/1933 | Klausmeyer | 408/135 |
| 2,084,686 | 6/1937 | Howard | 408/135 |
| 3,033,298 | 5/1962 | Johnson | 408/59 |
| 4,466,601 | 8/1984 | Raines | 408/109 |

FOREIGN PATENT DOCUMENTS

| | | | |
|---|---|---|---|
| 2428703 | 1/1976 | Fed. Rep. of Germany | 408/109 |
| 778951 | 11/1980 | U.S.S.R. | 408/90 |

*Primary Examiner*—William Briggs
*Attorney, Agent, or Firm*—Charles J. Prescott

[57] ABSTRACT

A modified concrete block, apparatus and method of manufacture for making the concrete block which includes a bored arch-shaped inspection hole formed through one side wall into one cavity of the concrete block. The inspection hole, used for inspecting reinforcements within the cavity prior to filling with concrete, is formed by the apparatus and in accordance with the method of manufacture by boring a circular hole through the side wall at an acute angle to the side wall in alignment with one cavity. The hole, generally equal in diameter to the length of the cavity, is offset so that it extends from through one edge margin of the side wall toward, but not to, the other side margin of the side wall.

5 Claims, 3 Drawing Sheets

Fig. 1
PRIOR ART
Fig. 2
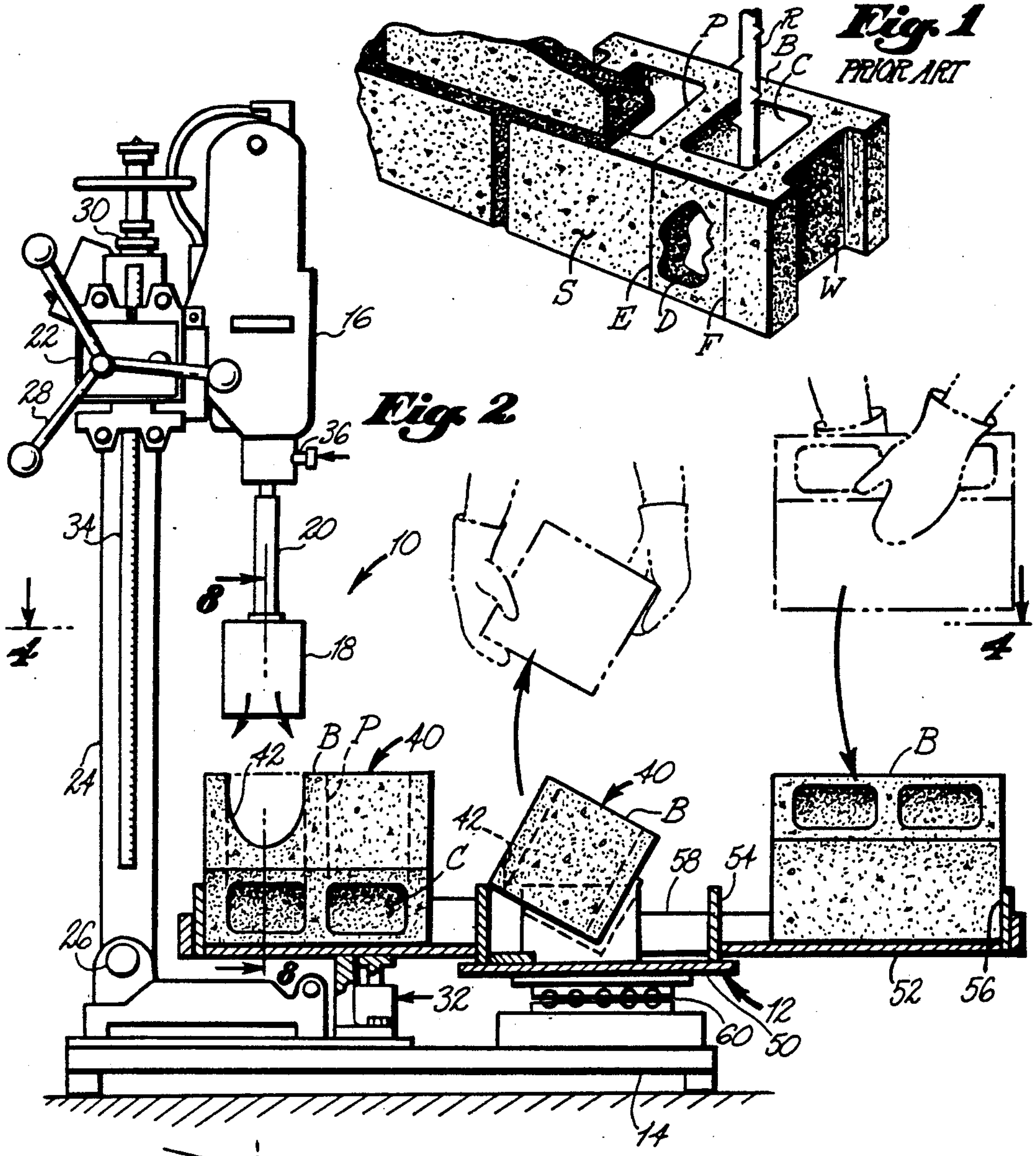
Fig. 3
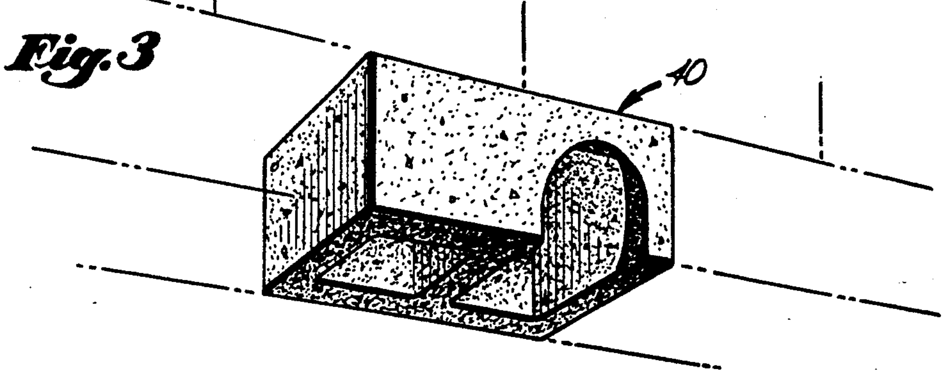

BORING APPARATUS AND METHOD OF MODIFYING CONCRETE BLOCKS

This is a divisional application of Ser. No. 07/477,330 filed Feb. 8, 1990, U.S. Pat. No. 4,958,467.

BACKGROUND OF THE INVENTION

This invention is related generally to the construction of concrete block for building walls, and more particularly to an improved concrete block, apparatus and method of manufacture of the improved concrete block which includes an inspection hole formed in one side wall of the concrete block.

Presently, building walls are typically fabricated of precast concrete block which is permanently secured atop foundations, footings or concrete slabs by interconnecting the building wall to steel reenforcement rods which have been previously embedded into and upwardly extend from these foundations. The reinforcement rods extend upwardly from these foundations a short distance into one of the cavities of one or more of the concrete blocks in the first or second lowest row of concrete blocks. However, an extension of these reinforcements is permanently secured by wiring or welding to the reinforcement rods embedded in the foundation. Thereafter, the column of cavities aligned in successive rows of concrete blocks forming the building wall is filled with concrete to effect a permanent rigid connection between the foundation and the concrete block wall around the reinforcements.

Prior to filling the continuous series of cavities which surround each upwardly extending reinforcement rod and its extension, a building inspector is generally required to insure that the connection between the reinforcement rod embedded and extending from the foundation is properly and permanently connected to the upward extension thereof. This inspection requires that an inspection hole be hammered or cut through at least one side wall of the concrete block within which the reinforcement connection is positioned. After inspection, the inspection hole must be damned prior to concrete being poured into the cavity column surrounding the reinforcement rod.

Presently, the on-site construction team which is fabricating the building walls requiring these inspection holes normally either hammers a hole through the side wall in each particular block which surrounds the reinforcement rod and its upward extension or uses a power circular saw to slice away that side wall portion, thus completely exposing the cavity. Utilizing either of these presently available techniques, many concrete blocks are broken and are thus rendered useless prior to or in conjunction with handling during their installation. When this occurs, the modified block must be discarded and another one selected for use.

The present invention provides an improved concrete block, apparatus and method of manufacturing the improved concrete block which includes an arch-shaped hole formed by boring through one side wall into one cavity whereby at least a portion of the side wall along one edge margin thereof is left in tact so as to maintain the overall integrity of the block and also so as to provide a quicker and more effective way to produce modified blocks for use in this inspection process.

BRIEF SUMMARY OF THE INVENTION

This invention is directed to a modified concrete block, apparatus and method of manufacture for making the concrete block which includes a bored arch-shaped inspection hole formed through one side wall into one cavity of the concrete block. The inspection hole, used for inspecting reinforcements within the cavity prior to filling with concrete, is formed by the apparatus and in accordance with the method of manufacture by boring a circular hole through the side wall at an acute angle to he side wall in alignment with one cavity. The hole, generally equal in diameter to the length of the cavity, is offset so that it extends from through one edge margin of the side wall toward, but not to, the other side margin of the side wall.

It is therefore an object of this invention to provide a modified precast concrete block having a bored arch-shaped inspection hole formed through one side wall into one cavity of the concrete block.

It is another object of this invention to provide an apparatus for making the above modified concrete block.

It is yet another object of this invention to provide a method of manufacturing the above modified concrete block.

In accordance with these and other objects which will become apparent hereinafter, the instant invention will now be described with reference to the accompanying drawings.

BRIEF DESCRIPTION OF THE DRAWINGS

FIG. 1 is a perspective view of the prior art technique of forming an inspection hole in a precast concrete block.

FIG. 2 is a side elevation section view of the apparatus and the modified concrete block.

FIG. 3 is a lower perspective schematic view of the modified concrete block with respect to other concrete blocks shown in phantom in a building wall.

DETAILED DESCRIPTION OF THE INVENTION

Figure 4:
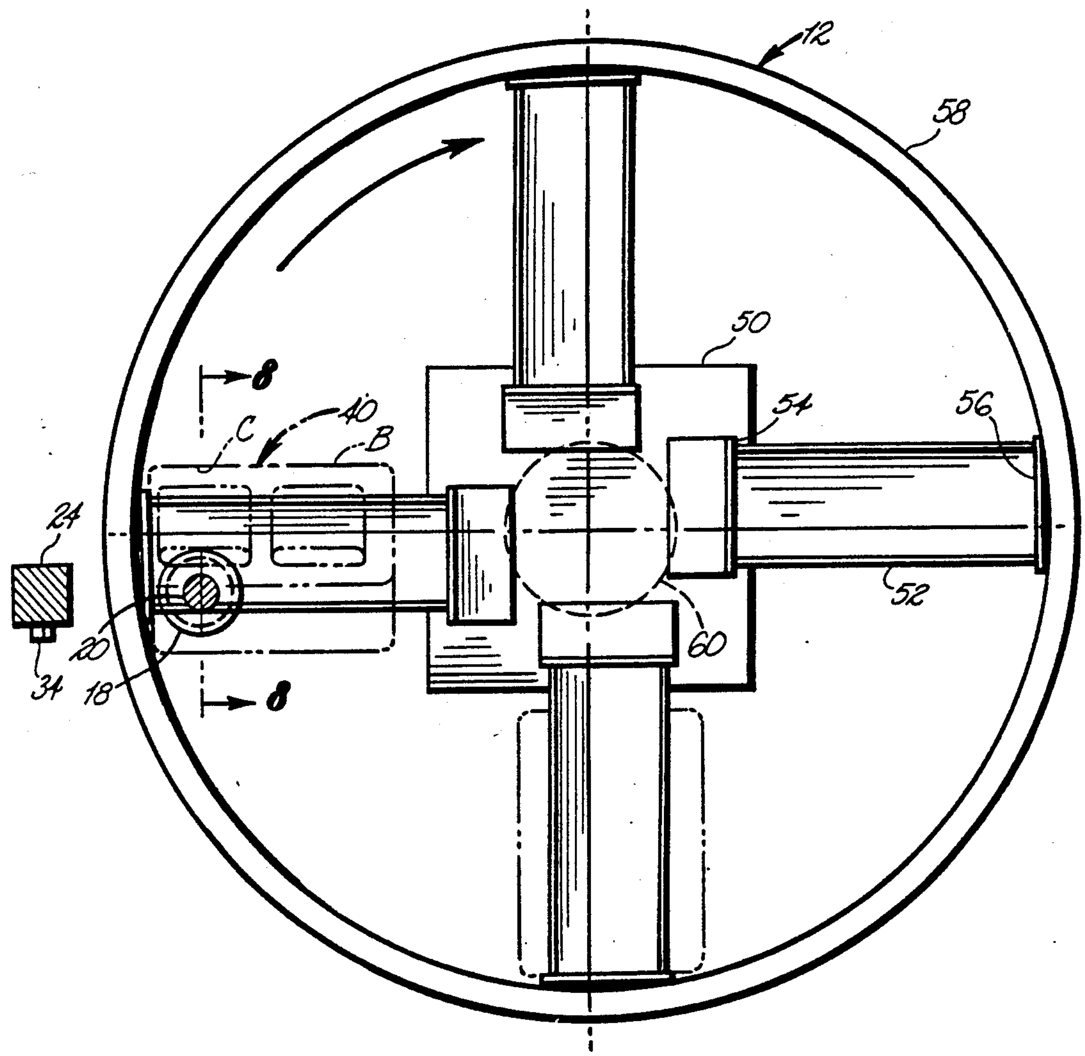
FIG. 4 is a section view in the direction of arrows 4—4 in FIG. 2.

Referring now to the drawings, and particularly to FIG. 1, the prior art technique of modification to a conventional concrete block B is there shown in conjunction with providing visual inspection of reinforcing rod R. The concrete block B is typically precast concrete and includes longitudinal side walls S held apart by parallel transverse walls W and interior partition P. Prior to filling cavity C with poured concrete, an inspector must determine that the interconnection of the reinforcing rod R to the foundation atop which the concrete block building wall is to be constructed is adequate. Inspection is facilitated prior to placement of the block B by either hammering a hole D into the side wall S in alignment with cavity C or, alternately, using a power circular saw to slice the side wall along E and F so as to completely remove that portion of the side wall S. In either event, the likelihood of breaking and rendering each concrete block B so modified is considerable, thus substantially increasing both labor and material costs.

Referring now to FIGS. 2, 3, 4, and 8, the apparatus for producing the modified concrete block 40 is shown generally at numeral 10. The apparatus 10 generally includes a support means 12 for the concrete blocks B and a power drill motor 16 inter-connected to the concrete block support means 12 by frame 14. The support means 12 includes a plurality of elongated channel support arms 52 which are connected and radially extend from hub plate 50. Hub plate 50 is mounted for rotation on bearing 60 which is connected atop frame 14 as shown in FIG. 2.

Each support arm 52 is sized to receive one concrete block B in longitudinal fashion as shown thereatop and oriented as will be described herebelow, the entire arrangement rotatable upon bearing 60. A guard ring 58 is provided so that the operator is kept clear of the rotating support arms 52. End plates 56 are provided so as to accurately position each concrete block B for boring as will be herebelow described.

Separate and apart from the concrete block support means 12, the preferred embodiment of the remainder of the apparatus, including motor 16, extension 20, diamond core bit 18, all supported on carriage 22 which in turn is slidably supported on column assembly 24 which, in turn, is pivotally connected at 26 on base plate 14, is collectively known commercially as a diamond coring system. The embodiment utilized by applicant in the present invention is Model DCMII manufactured by the Hilti Corporation of Tulsa, Okla. The particular diamond core bit 18 utilized by applicant is Item No. P.M. 5-00 by the Hilti Corporation, having a five inch (5") nominal bit diameter. These diamond core bits include impregnated industrial diamond material in the cutting edge in a well known fashion. In operation, the operator rotates feed handle 28, moving motor 16 up and down on rack 34 connected to column assembly 24. Water for cooling the coring bit 18 and for facilitating its cutting action is introduced through inlet 36 connectable to a water source for discharge out coring bit 18 in the direction of the arrows. Stop nuts 30 control the downward travel of motor 16.

Figure 8:
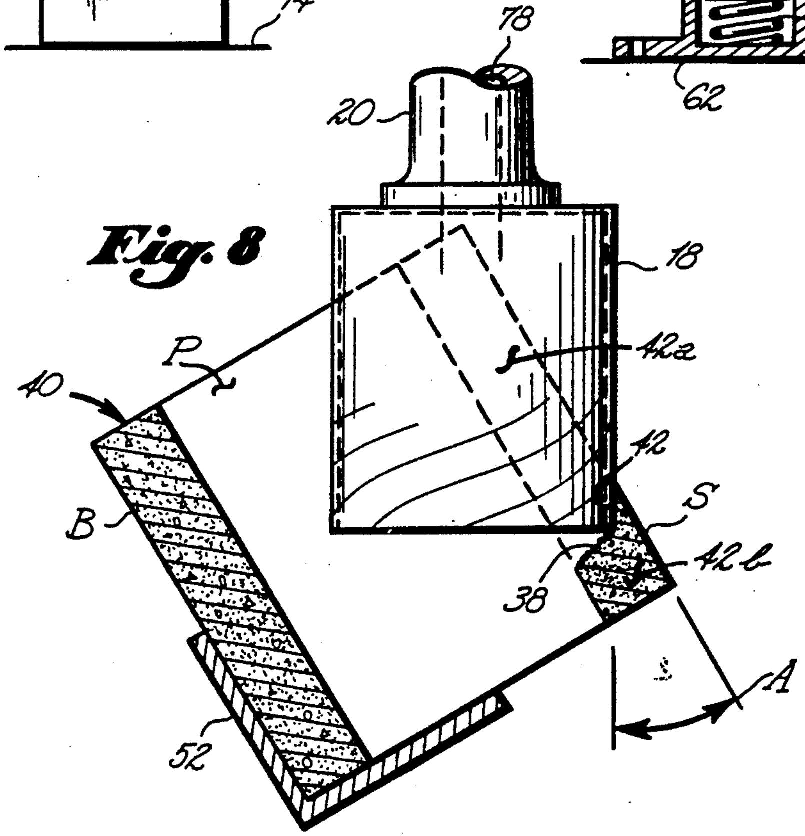
FIG. 8 is a section view in the direction of arrows 8—8 in FIGS. 2 and 4 with the boring device in its lowered position having modified the concrete block.

As best seen in FIG. 8, the axis of the coring bit 18, shown with respect to concrete block B in its final position after cutting, is oriented at an angle A with respect to the side walls S. Coring bit 18 is of a diameter generally equal to the length of cavity C as best seen in FIGS. 2 and 4. The coring bit 18 is offset with respect to the height of side wall S such that, upon fully completing the cutting cycle, portion 42*a* of side wall S is removed, thus forming arch 42 into the side wall S whereby a portion 42*b* of that side wall S remains intact.

Although the coring bit 18 may fully cut the cylindrical hole 42 through side wall S, it is preferred to stop the cutting short as shown in FIG. 8, whereupon a fracture occurs at 38 freeing side wall portion 42*a* for removal. By allowing side wall S to fracture through at 38, even more cross sectional strength remains at 42*b* while still providing a full arched hole for inspection. Because a clean cylindrical cut is made, the strength of side wall portion 42*b* is substantial in either event as contemplated by this invention. Both embodiments of the arched inspection hole are thus designated as "cylindrical".

Referring additionally to FIG. 3, the final form of the concrete block of the present invention is shown generally at numeral 40. Arched cylindrical hole 42, formed completely during one cutting pass of coring bit 18 is there depicted with respect to cavity C. As may now be more clearly understood, the arched hole 42, fully as wide as cavity C, is sufficiently sized for inspection of interior reinforcing rods as previously described. However, the portion 42*b* of the side wall S above the arched hole 42 remains, thus maintaining the full overall rectangular integrity and handling strength of the modified concrete block 40.

Figure 5:
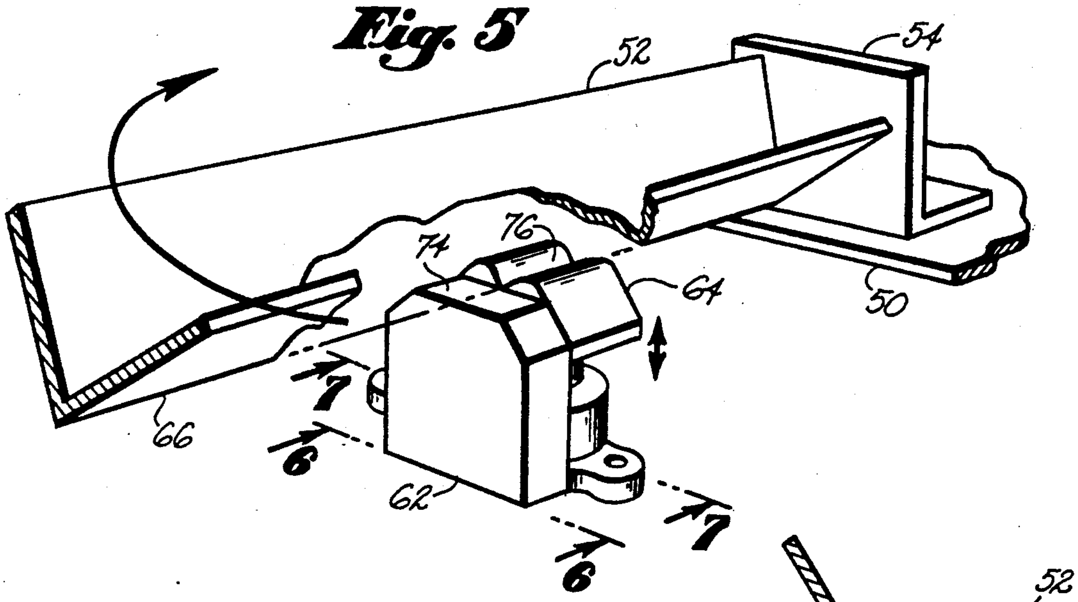
FIG. 5 is a perspective view of one of a plurality of concrete block support arms and indexing means of the apparatus shown in FIG. 2.
Figure 6:
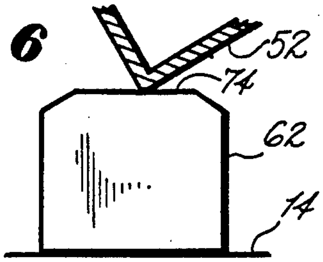
FIG. 6 is a section view in the direction of arrows 6—6 in FIG. 5.
Figure 7:
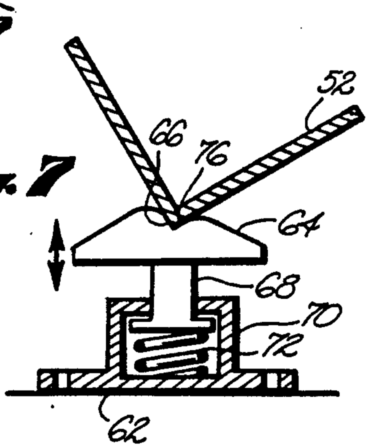
FIG. 7 is a section view in the direction of arrows 7—7 in FIG. 5.

Referring now to FIGS. 5, 6 and 7, the detent mechanism for insuring proper alignment of each support arm 52 on rotatable hub 50 with regard to the vertical axis of coring bit 18 is there shown. A support block 62 is connected atop base 14 such that the lowest edge 66 of support arm 52 is supported atop surface 74 so as to properly resist the downward boring force required to be exerted against the concrete block B to form hole 42. In order to insure proper alignment of each channel member 52 for accurate placement of each bored hole in the concrete blocks B, grooved block 64 is provided which is movable up and down on shaft 68 in the direction of the arrow against a compression spring 72 within housing 70. Block 64 includes groove 76 ramped on either side thereof as best seen in FIG. 7 so that edge 66 of each channel member 52 may slidably move into position during boring and then continue onward around to the next successive stage where the finished block 40 is removed thereafter.

It is here noted that, within the scope of this invention, the support arms 50 may also be oriented horizontally but at 90 degrees to the radial positioning shown whereby each support arm is tangent to the guard ring 58 or any imaginary horizontal circle concentric with the axis of bearing 60. Such a support arm configuration would facilitate sliding each concrete block from one end of the repositioned support arm to the other whereby access holes could be bored into each cavity of any given concrete block.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A method of making a modified concrete block comprising the steps of:

A. holding a conventional concrete block having a longitudinal axis and having upright parallel side and end walls, said side walls spaced apart by said end walls, and at least one interior transverse partition which forms at least two upright cavities through said conventional block;

B. aligning the longitudinal axis of a boring device generally perpendicular to the longitudinal axis of said concrete block and at an acute angle to one said side wall, said boring device generally equal in diameter to the length of, and aligned with, one said cavity;

C. boring a hole through one said side wall and into said one said cavity, said hole extending from through the edge margin of one said side wall, toward, but not to, the other edge margin of said side wall.

2. An apparatus for making a modified conventional concrete block, the concrete block having:

upright parallel side and end walls, said side wall spaced apart by said end walls, and at least one interior transverse partition which forms at least two upright cavities through said block;

a cylindrical inspection hole formed into one said side wall in alignment and registry with one said cavity;

said inspection hole having an axis at an acute angle with respect to vertical and having a diameter generally equal to the length of said cavity;

said inspection hole extending from through one edge margin of said side wall toward, but not to, the other edge margin of said side wall;

said apparatus comprising:

motor means for rotating and axially moving a boring means for forming said hole;

support means for holding the conventional concrete block such that the axis of said boring means is generally perpendicular to the longitudinal axis of the concrete block and at an acute angle to one said side wall;

said support means is a plurality of elongated support arms connected to a rotatable hub;

each of said plurality of support arms is generally perpendicular to, and the rotational axis of said hub spaced and generally parallel to, said boring means axis.

3. An apparatus as set forth in claim 2, further comprising:

means in said motor means for introducing water to the cutting edge of said boring means during boring of said hole.

4. An apparatus as set forth in claim 2, further comprising:

index means for releasable establishing proper rotational alignment of said hub such that each said hole is accurately bored.

5. An apparatus as set forth in claim 4, further comprising:

a guard ring connected around the distal ends of each of said plurality of support arms and forming a continuous perimeter for said support means.

* * * * *